United States Patent
Matousek

[15] 3,675,895
[45] July 11, 1972

[54] TRUNION MOUNTING FOR ENCAPSULATED BALL VALVE

[72] Inventor: Stephen Matousek, Moraga, Calif.
[73] Assignee: Whitey Research Tool Co.
[22] Filed: May 28, 1970
[21] Appl. No.: 41,381

[52] U.S. Cl..............................251/315, 251/317, 251/362, 137/454.2, 251/214
[51] Int. Cl.......................................................F16k 27/06
[58] Field of Search...................137/454.2, 454.6; 251/171, 251/315, 316, 317, 214, 309, 362

[56] References Cited

UNITED STATES PATENTS

| | | | |
|---|---|---|---|
| 2,117,456 | 5/1938 | Schellin | 251/309 |
| 3,192,943 | 7/1965 | Moen | 137/454.6 X |
| 3,192,948 | 7/1965 | Anderson | 137/454.6 |
| 3,498,585 | 3/1970 | Temple | 251/315 |
| 3,445,087 | 5/1969 | Priese | 251/315 X |
| 3,100,500 | 8/1963 | Stillwagon | 251/317 X |
| 3,124,334 | 3/1964 | Szohatzky | 251/214 |
| 3,236,495 | 2/1966 | Buchholz | 251/171 |

*Primary Examiner*—Harold W. Weakley
*Attorney*—Fay, Sharpe and Mulholland

[57] ABSTRACT

The specification and drawings show a ball valve including a housing defining an internal valve chamber and inlet and outlet flow passages extending through the housing and into the chamber. A ball member having a through flow aperture is positioned centrally in the chamber and an actuating stem extends radially from the ball to a position outside the housing. In the embodiment shown, the chamber is cylindrical and the ball and stem are axially aligned with the axis of the chamber. A resilient packing of synthetic resinous material, such as polytetrafluoroethylene or the like, is disposed in the chamber to surround the ball and sealingly engaging both the ball and the inner walls of the chamber. The packing fills substantially all voids between the ball and the chamber except for ports formed through the packing between the inlet and outlet passages and the ball. Positioned beneath the ball and axially aligned with the stem is a rigid trunion member which extends through the packing between the ball and the end wall of the chamber. The trunion is either integral with the ball and spaced a slight distance from the end wall or, alternately, it is carried by the end wall and spaced a slight distance from the ball.

4 Claims, 6 Drawing Figures

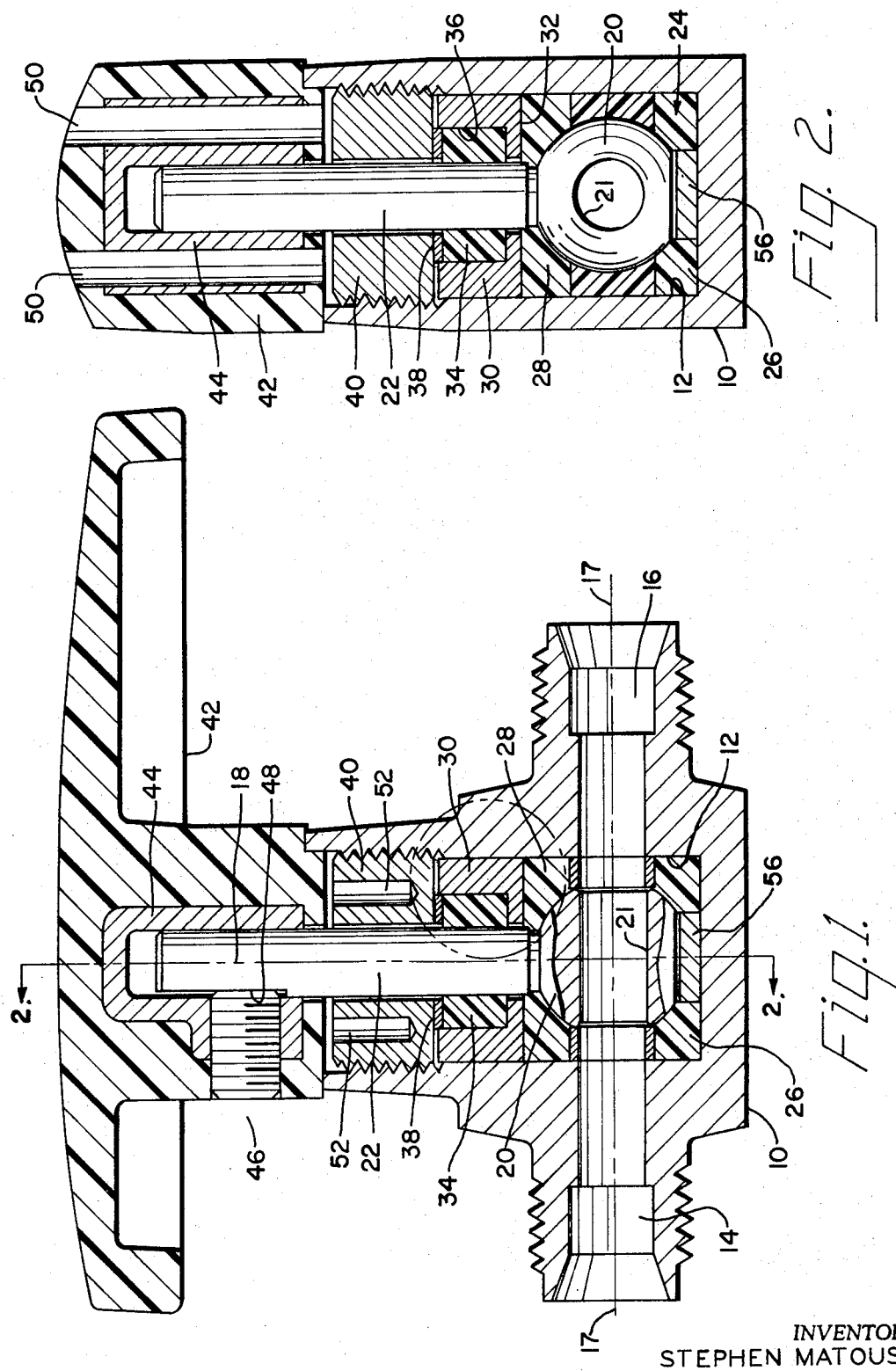

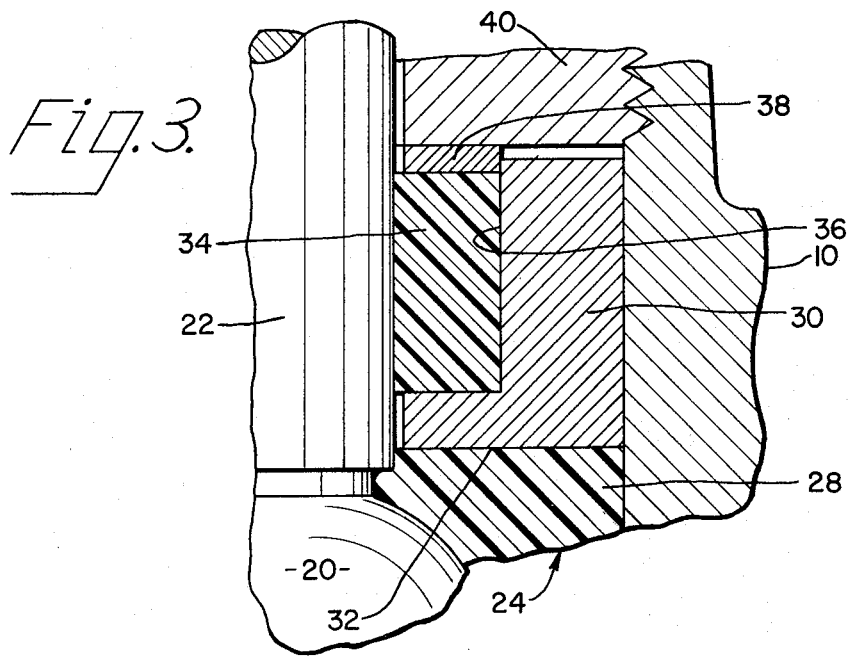
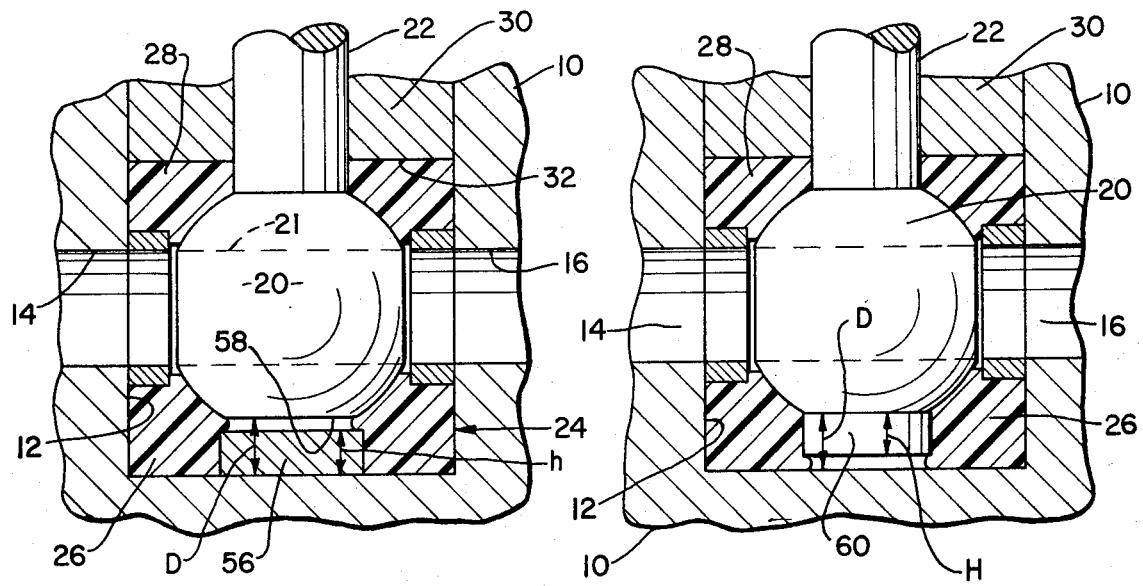

INVENTOR.
STEPHEN MATOUSEK
BY
Fay, Sharpe & Mulholland
ATTORNEYS.

TRUNION MOUNTING FOR ENCAPSULATED BALL VALVE

The subject invention is directed toward the valve art and, more particularly, to an improved ball valve.

The invention is particularly suited for use in small size ball valves of the kind used in instruments and instrumentation systems and will be described with particular reference thereto; however, it will be appreciated the invention is capable of broader application and can be embodied in many sizes of valves for many uses.

One of the well known types of ball valves which is particularly suitable in the small sizes needed for instrumentation, uses a capsule packing of synthetic resinous material such as polytetrafluoroethylene. Generally, this type of valve includes a housing having an internal valve chamber and the usual inlet and outlet passages. The ball is positioned centrally within the chamber and a valve operating stem extends from the ball axially of the chamber to a position outside the housing. The packing surrounds the ball and stem and fills substantially all voids between the ball and the chamber except for ports which extend from the inlet and outlet passages to the ball.

Normally, the packing is placed under a compressive preload by an adjustable nut positioned about the stem in the upper end of the chamber. Tightening of the nut places a compressive load on the packing to cause it to sealingly engage the outer surface of the ball and the inner surface of the chamber. Normally, the valves are arranged so that adjustment of the packing can be accomplished while the valve is in service.

These valves have been especially satisfactory and provide a fluid tight seal throughout a wide range of operating pressures, since the preloaded packing does not require line pressure to assure a fluid tight seal.

It has been found, however, that certain problems result because of non-uniform distribution of compressive forces within the packing. The non-uniform distribution can be understood by a review of the ball, stem and packing relationship. First, the lower end of the ball has been fully hemispherical and the lower half of the packing has had a hemispherical cavity that fitted around the entire lower half of the ball. The upper half of the packing had a hemispherical cavity which engaged the top of the ball and a cylindrical opening through which passed the stem.

As the preload was applied from the top, the top half of the packing compressed against the ball and pressed the ball against the lower half of the packing. The packing directly under the ball at its centerline was placed in purely axial loading. Consequently, there were no forces generated in this area of the packing to cause it to move laterally. Furthermore, because the packing directly under the ball was relatively thin, the total axial deflection was small. Because of these factors, certain surfaces were not fully sealed and slight wearing between the ball and the packing produced substantial changes in the compressive forces.

The present invention overcomes the above problems and provides a ball valve of the type described wherein the resultant compressive preload forces within packing are always uniformly distributed and radial relative to the ball center. This causes the packing to move in all directions and form a seal at all mating surfaces. Further, wear between the ball and the packing is more uniform about the ball and, accordingly, retightening of the packing must be accomplished at far less frequent intervals. Also, the cycle life of the valves are increased by a factor of as much as 10 and more.

Generally, the invention contemplates a ball valve including a housing defining an internal valve chamber and inlet and outlet flow passages extending through the housing and into the chamber. A ball member having at least one aperture is positioned centrally in the chamber and an actuating stem extends radially from the ball to a position outside the housing. Preferably, but not necessarily, the chamber is cylindrical and the ball and stem are axially aligned with the axis of the chamber. A resilient packing of synthetic resinous material, such polytetrafluoroethylene or the like, is disposed in the chamber to surround the ball and sealingly engaging both the ball and the inner walls of the chamber. Preferably, the packing substantially fills all voids between the ball and the chamber except for ports formed through the packing between the inlet and outlet passages and the ball. Positioned beneath the ball and axially aligned with the stem is a rigid trunnion member which extends through the packing between the ball and the end wall of the chamber. The trunnion is either integral with the ball and spaced a slight distance from the end wall or, alternately, it is carried by the end wall and spaced a slight distance from the ball.

Because of the addition of the trunnion, the packing can be completely symmetrical about the ball. Further, the short section of packing present in prior valves is eliminated. As a consequence, the preloading forces are uniformly distributed and act radially of the ball. The slight clearance space adjacent the trunnion permits a thin edge or lip of packing to extrude into the clearance and form a low friction bearing surface to prevent metal-to-metal rubbing contact.

Accordingly, a primary object of the invention is the provision of an encapsulated type ball valve wherein the ball and packing are arranged so that the compressive preloading forces in the packing are uniformly distributed and act radially of the ball.

Another object of the invention is the provision of a ball valve of a general type described wherein the packing uniformly engages the internal walls of the valve chamber and the entire outer surface of the ball.

A still further object is the provision of an encapsulated type ball valve which has the packing entirely symmetrical about the ball and wherein top loading of the packing produces uniformly distributed compressive loading in the packing.

Yet another object of the invention is the provision of a ball valve of the type described which is simple to manufacture and wherein retightening of the packing is necessary only at extended intervals.

A still further object is the provision of a ball valve of the encapsulated packing type having a trunnion member which extends between the ball and the inner wall of the chamber at a location axially aligned with the ball valve actuating stem.

These and other objects and advantages will become apparent from the following description when read in conjunction with the accompanying drawings wherein:

FIG. 1 is a longitudinal cross-sectional view through a ball valve embodying the invention;

FIG. 2 is a cross-sectional view taken on line 2—2 of FIG. 1;

FIG. 3 is an enlarged view showing the circled area of FIG. 1;

FIGS. 5 and 6 are enlarged showings of two trunnion arrangements.

Figure 4:
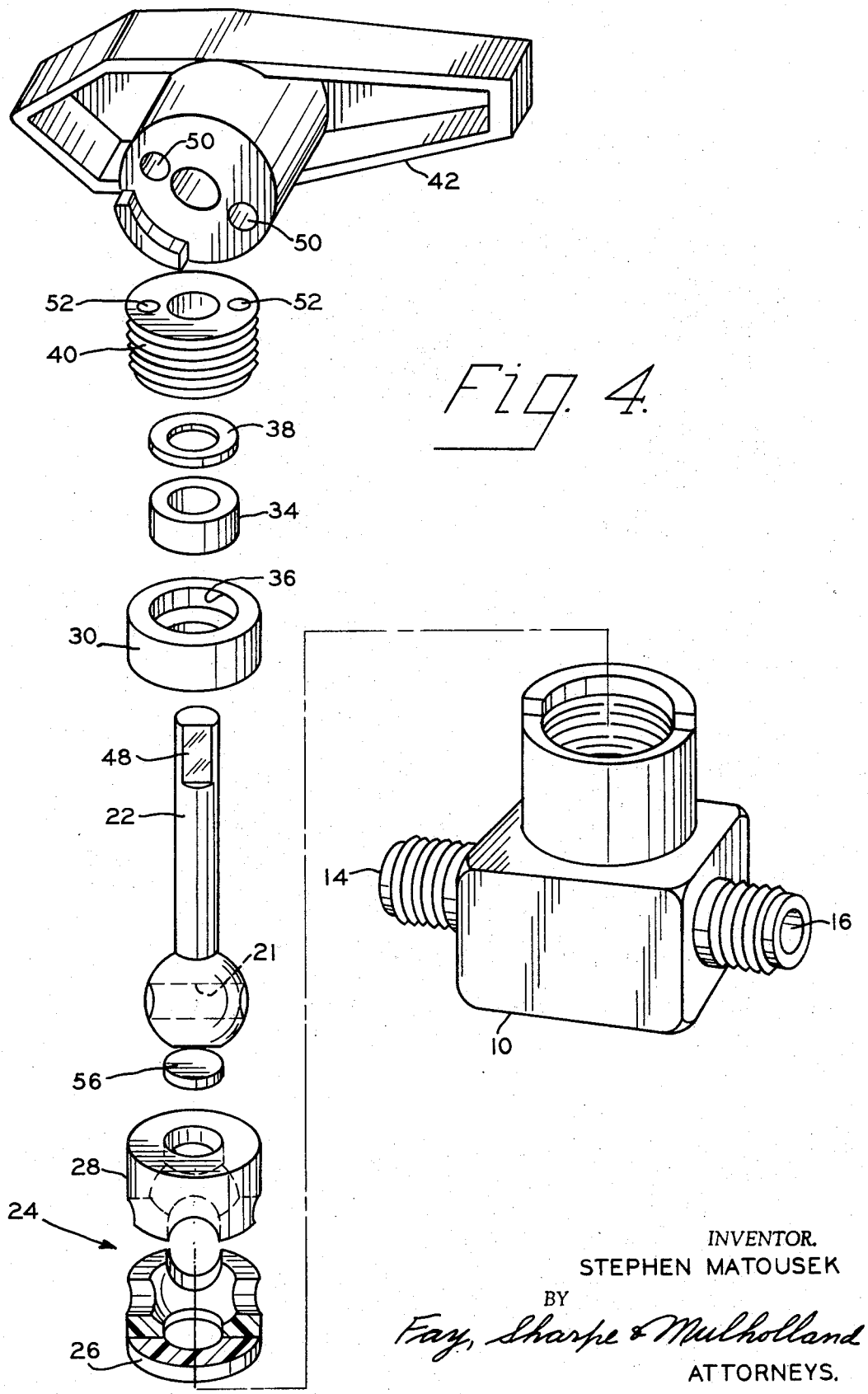
FIG. 4 is an exploded pictorial view of the valve of FIG. 1.

Referring more particularly to FIGS. 1 and 2 of the drawings, the preferred embodiment of the invention includes a housing 10 which, in the subject embodiment, is machined from a single piece of stock, such as brass. This type of housing is generally referred to as a "bar stock" housing. A cylindrical valve chamber 12 extends into the housing 10. The chamber 12 is connected with the outside of the housing by aligned inlet and outlet ports 14 and 16, respectively. As will be noted, the axis 17 of the ports 14 and 16 intersects, and is perpendicular to, the axis 18 of the chamber 12. It should be understood that other types of housings and inlet and outlet ports arrangements could equally well be used. For example, the housing could be a multi-port housing or the valve could have multiple ports and different flow patterns.

Positioned within chamber 12 and adapted to control flow of fluids between the inlet port 14 and the outlet port 16 is a ball valve member 20 which is preferably positioned centrally of chamber 12 with its axis aligned with axis 18. The ball 20 has an aperture 21 extending therethrough. The diameter of the aperture is shown as substantially equal to the diameter of the inlet and outlet passages 14, 16. The ball is mounted for rotation about axis 18 by a cylindrical, upwardly extending actuating stem 22. In the embodiment under consideration, stem 22 is formed integrally with the ball member 20 and is aligned with a diameter of the ball and axis 18.

The ball is encapsulated in a packing 24 formed from a synthetic, resilient resinous material such as polytetrafluoroethylene. In the embodiment shown, the packing is machined in two separate sections 26 and 28 which have the configuration shown in FIG. 5. Note that each of the sections has a hemispherical recess portion which engages opposite sides of the ball. Additionally, the sections have cooperating recesses which define the inlet and outlet ports and have metallic rings positioned therein. The rings are formed as shown in the commonly assigned U.S. Pat. No. 3,236,495 issued Feb. 22, 1966 to Buchholz.

The packing is placed under a compressive preload to cause it to sealingly engage the inner walls of the chamber 12 and the outer surface of the ball 20. Many types of arrangements can be used for applying the compressive preload; however, in the embodiment under consideration, the means include a gland member 30 which is of generally cylindrical shape and slidingly received in the upper end of the valve chamber 12. The lower face 32 of gland 30 is generally planar and rests on the top surface of the packing 24. Carried within the gland 30 is a bushing, preferably formed from polytetrafluoroethylene, which has a central, axial opening sized to closely engage the outer surface of the stem 22. The bushing 34 is closely received in a recess 36 formed within the gland 30. Engaged with the upper surface of the bushing 34 is a second washer-like gland member 38 which is sized so as to be closely but slidably received in the upper end of the recess 36. A threaded nut member 40 is threadably received in the outer end of the valve chamber 12. By tightening the nut member 40, a compressive preload is placed on the bushing 34 causing it to sealingly engage the stem 22. Additionally, force is transmitted through the bushing 34 and the gland 30 to apply a compressive preload to the packing 26.

A handle member 42 is connected to the upper end of the stem 22 for adjusting the position of the ball valve member 20. The handle shown is formed from plastic with a metal insert 44 which receives the stem 22. In the embodiment under consideration, the handle is removably connected to the stem 22 by a set screw 46 which engages a flat 48 formed on the upper end of the stem.

To allow the nut 40 to be adjusted while the valve is in service, aligned openings 50 extend through the handle. Similarly, spaced openings 52 are formed in the top surface of the nut member 40. By releasing the set screw 46 and inserting a pair of rods or the like downwardly through openings 50 and into engagement with openings 52, it is possible to tighten the gland 52 by merely rotating the handle. When the gland is properly tightened, the rods can be removed, the handle rotated to its proper position, and the set screw 46 retightened.

As previously discussed, in the prior encapsulated type ball valves problems were encountered with non-uniform distribution of compressive preload forces within the packing material. The subject invention overcomes the prior problems by the addition of a particular trunnion member beneath the ball 20. The trunnion is arranged so that the two halves of the packing can be fully symmetrical about the centerline 18. Additionally, the trunnion eliminates the short height of packing which was beneath the ball in the prior constructions and which, because of its limited height and absence of deflection, would not transmit compressive forces in a lateral direction to provide lateral movement of the packing in the lower end of the valve chamber. In particular, referring to FIGS. 5 and 6, there are shown two modifications of the trunnion arrangement which have been found to be particularly satisfactory. FIG. 5 shows the arrangement used in the valve of FIGS. 1 and 2. As shown, it includes a flat disc member 56 which is carried on the lower end wall of the valve chamber 12. The lower end of the ball 20 is provided with a flat 58 which is perpendicular to the axis 18 and parallel to the end wall of the valve chamber 12. Disc 56 is preferably of a diameter substantially equal to the outer diameter of the ring members in the ports. The height of disc 56, identified with the letter $h$ in FIG. 5, is a very slight amount less than the distance D between the flat 58 on the ball and the end wall of the valve chamber 12. Accordingly, there is no metal-to-metal contact between the ball and the disc 56.

The packing members 26 and 28 are machined so as to closely engage the outer peripheral surface of the disc member 56. Accordingly, when the compressive preload is applied to the packing, a thin edge or lip of the packing extrudes into the small gap or recess and provides a bearing on which the ball can rotate. The presence of the disc 56 assures that the compressive forces within the packing are completely radial of the ball and further assures that all surfaces, i.e., the ball surface, the internal surfaces of the valve chamber, and the surfaces about the port rings are sealingly engaged by the packing. Additionally, the arrangement of the trunnion or disc member 56 is such as not to require any special seals in the valve housing or between the trunnion and the housing.

FIG. 6 shows a modified form of the invention in which the ball 20 has a trunnion member 60 formed integrally therewith. In this embodiment, the height H' of the trunnion portion 60 is slightly less than the total distance D from the ball flat to the end wall of the valve chamber 12. Accordingly, when the packing is loaded, a lip or edge of the packing extrudes under the trunnion and provides a bearing on which the trunnion can rotate. The trunnion 60, however, accomplished the same result as the disc member 56 in that it causes a completely uniform distribution of compressive forces within the packing.

In both the FIG. 5 and 6 embodiments, it is important that the height of the trunnion portion be less than the total distance between the ball flat and the end wall of the valve chamber. Otherwise, metal-to-metal contact would result and proper engagement of the ball and packing could not be assured.

The invention has been described in great detail sufficient to enable one of ordinary skill in the valve art to make and use the same. Obviously, modifications and alterations of the preferred embodiment will occur to others upon a reading and understanding of the specification and it is our intention to include all such modifications and alterations as part of our invention insofar as they come within the scope of the appended claims.

What is claimed is:

1. A ball valve comprising: a housing having an internal valve chamber; inlet and outlet flow passages extending through said housing and into said chamber; a ball member positioned in said chamber and having at least one flow aperture extending therethrough; means engaged with said ball for rotating said ball about an axis so that rotation of said ball can control flow through said inlet and outlet flow passages;

a resilient packing of synthetic resinous material filling said chamber and surrounding and sealingly engaging said ball and the walls of said chamber; ports formed in said packing at locations aligned with said inlet and outlet flow passages; means for adjustably applying a compressive loading to said packing in directions parallel to the axis of rotation of said ball; and, a rigid trunnion member on which said ball is adapted to rotate, said trunnion member extending through and being closely received in and engaged on all sides by said packing between an internal wall of said chamber and said ball and aligned with the axis of rotation of said ball, the height of said trunnion member being sufficiently less than the distance between the ball and the internal wall of said chamber to provide a clearance space into which said packing material will flow under compressive loading.

2. The ball valve as defined in claim 1 wherein said trunnion is of cylindrical configuration and said ball has a flat formed on its outer surface, said flat being perpendicular to the axis of rotation of said ball.

3. The ball valve as defined in claim 1 wherein said trunnion is integral with said ball and clearance space is between the trunnion and the internal wall of the chamber.

4. The ball valve as defined in claim 1 wherein said trunnion comprises a cylindrical disc member positioned in engagement with an internal wall of the housing and sized so that the clearance space is between the ball and the disc member.

* * * * *